(12) United States Patent
Fargher et al.

(10) Patent No.: US 6,266,646 B1
(45) Date of Patent: Jul. 24, 2001

(54) METHOD AND APPARATUS FOR PROVIDING CHOICES FOR A FACILITY

(75) Inventors: Hugh E. Fargher, Allen; Richard A. Smith, Garland, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/096,538

(22) Filed: Jul. 22, 1993

(51) Int. Cl.$^7$ ........................................ G06F 19/00
(52) U.S. Cl. ................................................ 705/9
(58) Field of Search ........................... 364/401, 402, 364/403, 468, 478; 395/904

(56) References Cited

U.S. PATENT DOCUMENTS

| | | | |
|---|---|---|---|
| 5,093,794 | * 3/1992 | Howie et al. | 364/468 |
| 5,148,370 | * 9/1992 | Litt et al. | 364/468 |
| 5,155,679 | * 10/1992 | Jain et al. | 364/402 |
| 5,212,791 | * 5/1993 | Damian et al. | 395/650 |

OTHER PUBLICATIONS

Lawrence M. Wein Scheduling Semiconductor Wafer Fabrication, vol. 1, No. 3, 8/88, IEEE Transactions on Semiconductor Manufacturing, pp. 115–130.

James F. Allen, Maintaining Knowledge about Temporal Intervals, vol. 26, No. 11, 11/83, Communications of the ACM, pp. 832–843.

Patrick Henry Winston, Artificial Intelligence, 2nd Edition, Chapter 4, Exploring Alternatives, Addison–Wesley Publishing Company, Inc., pp. 87–101.

Mark S. Fox and Stephen F. Smith, ISIS–a knowledge-–based system for factory scheduling, vol. 1, No. 1, 7/84, Expert Systems, pp. 25–49.

R.M. Kerr and R.N. Walker, A Job Scheduling System Based on Fuzzy Arithmetic, pp. 433–450.

C. Roger Glassey and Mauricio G. C. Resende, Closed-–Loop Job Release Control for VLSI Circuit Manufacturing, vol. 1, No. 1, 2/88, IEEE Transactions on Semiconductor Manufacturing, pp. 36–46.

* cited by examiner

Primary Examiner—Donald E. McElheny, Jr.
(74) Attorney, Agent, or Firm—W. Daniel Swayze, Jr.; W. James Brady; Frederick J. Telecky, Jr.

(57) ABSTRACT

The list of priorities which include both planner goals, and scheduling goals are employed to produce a global production list of goals. The goals list is used to resolve a choice.

12 Claims, 3 Drawing Sheets

CHOICE LIST (100)
- CHOICE #1 — 110
- CHOICE #2 — 112
- CHOICE #3 — 114
- ⋮
- CHOICE #N — 116

*FIG. 3*

GOALS LIST (130)

| | | |
|---|---|---|
| 134 — GOAL #1 PLANNER CONSTRAINTS PLANNER HEURISTIC | P | 132 |
| | NS | 136 |
| 138 — GOAL #2 PLANNER CONSTRAINTS SCHEDULER CONSTRAINTS SCHEDULER HEURISTICS | P | 140 |
| | S | 142 |
| 144 — GOAL #3 SCHEDULER CONSTRAINTS SCHEDULER HEURISTICS | NP | 146 |
| | S | 148 |
| 150 — GOAL #4 PLANNER CONSTRAINTS PLANNER HEURISTICS | P | 152 |
| | NS | 154 |
| ⋮ | | |
| GOAL N | | |

*FIG. 4*

GLOBAL PRODUCTION STRATEGY (200)

| | |
|---|---|
| 210 — GOAL #3 / SCHEDULER CONTRAINTS / SCHEDULER HEURISTICS | NP |
| | S |
| 212 — GOAL #2 / PLANNER CONTRAINTS | P |
| SCHEDULER CONTRAINTS / SCHEDULER HEURISTICS | S |
| GOAL #4 / PLANNER CONTRAINTS | P |
| PLANNER HEURISTICS | NS |
| ⋮ | |
| GOAL N | |

*FIG. 5*

PLANNER AND SCHEDULER PRIORITES (160)

- SCHEDULER GOAL #3 — 162
- PLANNER GOAL #2 — 164
- PLANNER GOAL #4 — 166
- PLANNER OR SCHEDULER GOAL #N

*FIG. 6*

METHOD AND APPARATUS FOR PROVIDING CHOICES FOR A FACILITY

CROSS REFERENCE TO RELATED PATENT APPLICATIONS

This present invention incorporates in their entirety by reference Ser. No. 08/096,536, abandoned, entitled, "Method and Apparatus for Performing a Beam Search"; Ser. No. 08/096,529, abandoned, entitled, "Method and Apparatus for Determining an Initial Time Interval"; and Ser. No. 08/095,875, abandoned, entitled, "Method and Apparatus for Analyzing a Plan"; all filed on Jul. 22, 1993. +gi This invention was made with Government support under Contract No. F33615-88-C-544A awarded by the United States Air Force. The Government may have certain rights in this invention.

TECHNICAL FIELD OF THE INVENTION

The invention generally relates to factory systems and more specifically to a method and system for production planning.

BACKGROUND OF THE INVENTION

Semiconductor manufacturing is broadly divided into three areas, material, preparation and design, for example, designing the circuits to be fabricated, preparing photolithography masks and making raw wafers, and wafer processing, for example constructing circuits into the wafer and assembly, packaging and testing, for example which packages and tests each individual circuit.

Production planning is the process of choosing objects to be started and to be worked in a manufacturing facility during some future time period or time interval in accordance with a plan so that performance is maximized. These objects are usually selected from a variety of product types which may require different resources and serve different customers. Therefore, the selection of the object must optimize customer-independent performance measures such as cycle time and customer-dependent performance measures such as on-time delivery.

The reasons for requiring advance production planning may be unique to each manufacturing facility or factory. For example, one facility may require advanced planning so that materials may be ordered and delivered in time for the manufacturer. Another facility may require advanced planning to make delivery commitments to customer or predict delays in delivery of the product, namely the object.

To configure a production plan which yields the best performance, the capacity, or amount of work the facility can complete must be modeled in some fashion, since planning objects to be worked when the capacity of the facility has been reached compromises performance and yields no positive benefits.

The production plan usually entails construction of schedules of the objects to be worked to govern the production of orders of the objects in the job shop or facility. The construction of schedules to govern the production of orders in a facility is a complex problem that is influenced by knowledge or information accumulated from many different sources within the facility. The acceptability of a particular schedule or plan depends upon diverse and conflicting factors such as due date requirements, cost restrictions, production levels, machine capabilities and substitutability, alternative productive process, order characteristics, order requirements and resource availability.

One prior technique uses a purely predictive approach to scheduling, based on a restricted model of the environment; predictions are made as to when operations are to be performed The resulting schedules or plan often bear little resemblance to the actual state of the factory, leaving detailed schedules to the shop-floor supervisor.

OBJECTS OF THE INVENTION

It is an object of the invention to provide an ordered list of choices, taking into account constraints and goals.

It is a further object of the invention to provide a list of goals which can be used by either the production scheduler (the scheduler) or the production planner (the planner) to include a list of goals, some of which relate only to the planner, some only to the scheduler and some both to the scheduler and planner.

It is a further object of the invention to provide a global production strategy, such that the global production strategy contains goals from both the goals list of the planner and scheduler.

It is an object of the direct present invention to provide global control by assuring that the objects are planned and scheduled through the global production strategy.

SUMMARY OF THE INVENTION

The present invention provides an ordered list of choices which have been ordered in terms of goals and constraints.

The present invention provides a list of goals which includes both planner constraints, goals and heuristics and scheduler constraints, goals and heuristics.

The present invention matches a list of planner priorities with the goals to produce a global production strategy.

Further, the present invention provides global control of the scheduler and the planner by assuring that the objects are planned and scheduled through global production strategy such that both the planner and scheduler will achieve the same consistent goals.

The present invention includes an apparatus for generating a plan, comprising: circuitry for reading a list of priorities including both planner goals and scheduling goals and a goals list including goals indicating either a planner goal or a schedule goal comprising; circuitry for producing a global production strategy list from the priorities list and the goals list; and circuitry for resolving a choice from the goals list.

The present invention includes a goal that includes an indication to indicate if the goal is either a planner goal or a schedule goal.

The present invention includes a global production strategy list that includes a heuristic to resolve the choice.

The present invention includes a global production strategy that includes constraints to resolve the choice.

The present invention includes a method for producing a plan including the steps of: reading a list of priorities including both planner goals and scheduling goals and a goals list including goals indicating either a planner or a scheduler goal; the step of producing a global production strategy list from the list of priority and goals list; and the step of resolving a choice from the goals list.

The present invention includes the step of providing an indication to indicate if the goal is either a planner goal or a scheduler goal.

The present invention includes the step of providing heuristics to resolve the choice.

The present invention includes the step of providing constraints to resolve the choice.

These and other features of the invention that will be apparent to those skilled in the art from the following detailed description of the invention, taken together with the accompanying drawings.

DESCRIPTION OF THE DRAWINGS

FIG. 3 is a diagram of the choice list;

FIG. 4 is a diagram of the goals list;

FIG. 5 is a diagram of the global production strategy;

FIG. 6 is a diagram of the planning and scheduling priorities; and

DETAILED DESCRIPTION OF THE INVENTION

Figure 1:
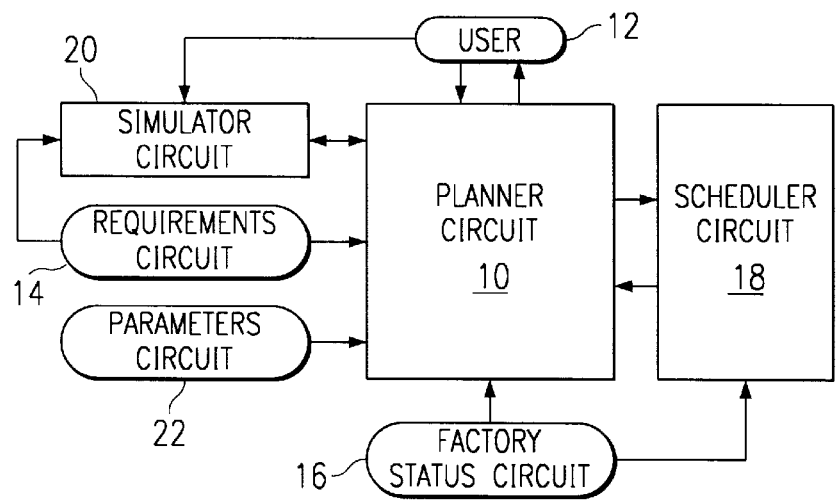
FIG. 1 is a block diagram of the present invention.

Referring to FIG. 1, the planner circuit (10) for developing a plan to be implemented by the facility is coupled to the parameters circuit (22) to input the parameters to the planner, the scheduler circuit (18) to produce a schedule of the facility, the user (12) to provide control of the planner circuit (10), the simulator circuit (20) to simulate possible plans and requirements circuit (14) to supply requirements to the planner (10). The factory status circuit (16) is coupled to the planner circuit (10) and scheduler circuit (18) to the input to both the planner circuit (10) and the scheduler circuit (18) the status of the facility, and user (12) is coupled to the planner, for example by a personal computer or a work station.

Figure 2:
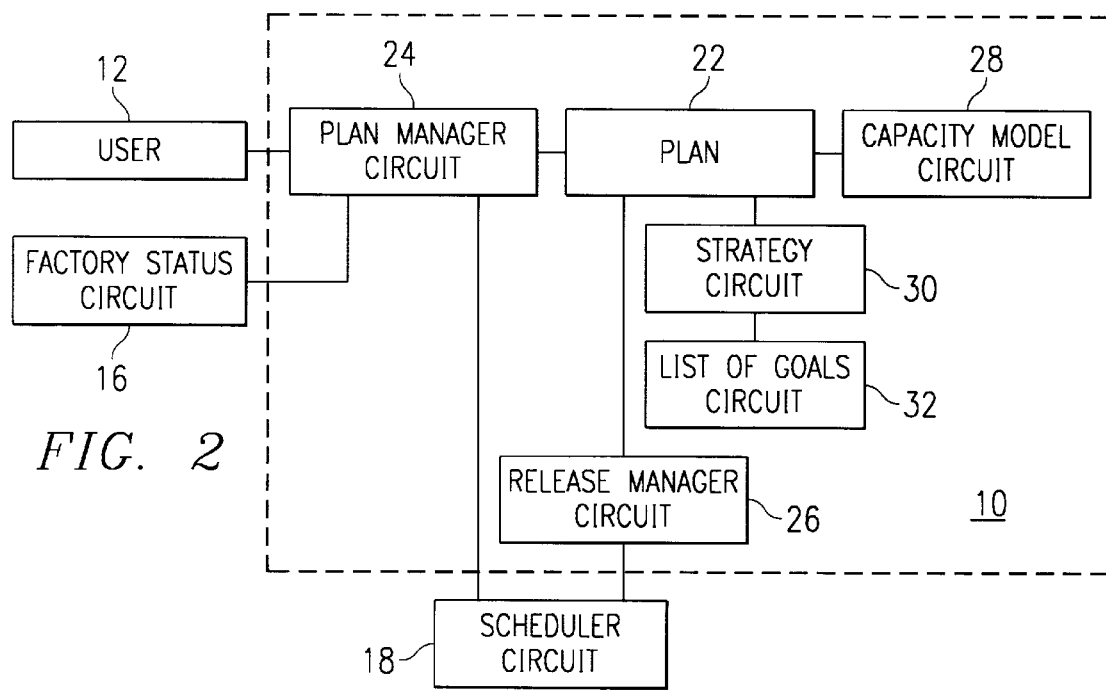
FIG. 2 is a block diagram of the planner of the present invention.

Referring to FIG. 2, the planner circuit (10) includes a plan manager circuit (24) to control the plan circuit (22), a release manager circuit (26) to schedule the release of objects, a capacity model circuit (28) to model the capacity of the facility, a strategy circuit (30) and a list goals circuit (32) to develop and control the strategy circuit (30).

The solution of the facility scheduling or planning problem includes using constraints and goals. Goals and constraints must discriminate among alternatives or hypothesis of plans, as well as to restrict the number of plans generated to an optional plan or near optional plan.

The scheduling or planning problem of the facility can be defined as selecting a sequence of operations or steps, for example a process routing, whose execution results in the completion of an order of a customer and assigning times, for example, start and end times and resources to each operation or step. The distinction between the scheduler and planner is not always distinct in that the object release could be a planning function, while dispatching or resources could be a scheduling function. Any attempt to provide a solution to the scheduling problem or the planning problem of the facility should begin with the consideration of scheduling and planning constraints and goals and their effect on the scheduling process.

The goals of the scheduler or planner include due dates, work-in-progress (WIP), shop stability, shifts, costs, productivity goals and quality.

The due dates are the dates that the objects must be produced by for the customers, and the lateness of the object affects consumer satisfaction. The work-in-progress inventory represents a substantial investment in raw materials and adds value to the objects. Since these investments are not recoverable until the delivery of the objects, reducing cycle time is desirable. Another goal is maintaining adequate levels of resource levels, in that adequate levels of resources must be maintained to a necessary level in order to sustain the operations of the facility. If resources to produce the objects run out, the objects cannot be produced. Examples of resources include personnel, raw materials, tools, etc. Normally, each resource has an associated goal, for example the labor size must be smoothed over a month's interval or raw materials may be limited to a two day supply. Another goal is cost reduction; the cost may include material cost, wages and lost opportunities etc. Further, the reduction in cost may indirectly achieve other goals such as stabilization of the work force. Another goal is production levels. Advance planning could set production goals for each cost center in the facility. This serves two functions, namely designating the primary facilities of the plant by specifying higher production goals and producing a preliminary budget by predicting how much the facility will produce. A further goal is facility stability, such that facility stability is a function of the number of revisions to the schedule or plan and of the amount of disturbances in preparation that are caused by these revisions. Shop or facility stability also corresponds to the amount of time taken to communicate the revision to the facility and the preparation time of the revisions.

In addition to the goals, there are various constraints which in the near future cannot be changed, for example, one physical constraint is the number of machines in a facility. Constraints include physical constraints, causal restraints, availability constraints and preferment constraints. In the near future which usually covers the planning horizon, the number of machines cannot be changed. Thus, the physical constraints include the machine physical constraints, the setup times of the machines, the processing times of the objects. Additionally, causal constraints define conditions which must be satisfied before initiating an operation or sequence of steps. One such causal constraint is process routing which is the sequence of operations of the object in that the process routing must particularly define a processing step which must occur before another processing step. Furthermore, there may be restriction such as the minimum or maximum amount of time between processing steps, product temperature to be maintained, etc., which further restricts or constrains the process routing. Other causal restrictions include processing step alternatives, machine alternatives, tool requirements, material requirements, personnel requirements and processing step transfer time. Another type of constraint is availability constraints including resource reservations, machine down times and shifts of personnel. Another type of constraint includes preference constraints including processing steps, machine preference and sequencing preferences for example the floor supervisor of the facility may desire that one machine be used instead of another by reasoning that cost or quantity justifies the preference with insufficient data to justify the constraint in another fashion.

Referring to FIG. 3, a choice list (100), for example a file, includes a list of choices including choice #1 (110), choice #2 (112) and choice #3 (114). These may be data items found in memory of the planner such as RAM, ROM, etc, or in a disk file system.

Referring to FIG. 4, goals list (130), for example a file positioned in a memory or disk file system, includes goal #1 (134), including an indication (132) for example a symbol of "P" that the goal #1 (134) is a goal for the planner and an indication (136) for example a symbol of 'NS' that the goal #1 (134) not a goal of the scheduler. The goals list (130) could be located in the memory of the planner. Since the goal #1 (134) is to be used by the planner, this goal #1 (134), includes planner constraints and planner heuristics. Goal #2 (138) includes an indication (140), for example the symbol 'P' that this goal (138) is a goal for the planner, additionally, the goal #2 (138) includes an indication (142), for example, the symbol "S" that goal (138) is a goal for the scheduler. Goal #2 (138) includes planner constraints, scheduler constraints and scheduler heuristics. Goal #3 (144) includes an indication, for example by the symbol 'NP' that goal #3 (144) is not a goal for the planner and includes a indication (148) for example by symbol 'S' that goal (144) is a goal for the scheduler. Goal (150) includes an indication (152), for example of the symbol 'P', that goal (150) is a goal for the planner. The goal #4 (150) includes planner constraints and planner heuristics. The particular order of the goals list does not relate to significance of the particular goal. Thus, the goals include an indication of the use of the goal.

Referring to FIG. 6, the planner and scheduler priorities (160) is a list of planner goals and scheduler goals, for example, stored in the memory of the planner in the order of importance. The planner and scheduler priorities (160) include, in order, scheduler goal #3 (162) followed by planner goal #2 (164), which is followed by planner goal #4 (166). The order of these planner and scheduler priorities is important in that the order of these priorities are related to the order in which objects are planned. Referring to FIGS. 4, 5 and 6, the global production strategy list (200), for example a file of a memory of the planner, is obtained from the planner and scheduler priorities (160) and the goals list (130). To develop the global production strategy list (200), the planner and scheduler priorities list (160) is read sequentially to obtain planner goals and scheduler goals. The position of the planner or scheduler goal, for example, planner goal #2 (164), with respect to the top of the planner is the priority of this goal for the global production strategy list.

The goals list (130) and the planner and scheduler priorities (160) are read to compare and to match the planner goals with the goals from the goals list, for example, planner goal #2 (164) is compared and matched with goal #2 (138). The planner is not concerned with scheduler goals and the scheduler is not concerned with planner goals. After the planner goal has been matched with the goal from the goals list, the information of the goal is read from the goals list and written to the global production strategy in the same position as the corresponding planner goal position with respect to other planner goals. Exemplary, the planner goal #2 (164) is read from the second position of the planner and scheduler priorities (160), and the goals list is read sequentially until the goal #2 (138) is obtained. The information corresponding to goal #2 (138) including for example the scheduler constraints and heuristics and the planner constraints and the symbol 'NP' and 'S' is transferred to the next available or second position of the global production strategy (200) to form the second member (212) of the global production strategy since goal #2 (164) is the first planner goal. The first member (210) of the global production strategy list (200) is a scheduler goal. The information from the goals list is simply transferred in its entirety from the goals list (130) to the global production strategy (200) in accordance with the relative position from the planner priority, and as a consequence, the relative order of the global production strategy list (200) is the same order as the planner and scheduler priorities list (160). The above mentioned procedure is repeated until the planner goals of the planner priority (160) is exhausted. There is no requirement that every member of the goals list (130) be included on the global production strategy (200) list since available scheduler and planner goals could have no priority in the planner and scheduler priorities list (160).

The goals list is employed to produce the choice list (100). If a choice for example an object or a time interval, is to be made, for example, between two objects to be planned or two intervals, first, the constraints are applied to each of the choices to determine if the constraint eliminates one of the choices. If one choice is eliminated the remaining choice is placed or written in for example by computer in the next available position in sequence in the choice list. The eliminated choice is placed or written in the next position of the choice list. These choices, for example the objects or time interval, are planned in the order of the choice list (100). If both or none of the choices are eliminated as a result of the constraints then none of the choices are added to the choice list.

Additionally, the heuristic provides a benefit for each choice by applying information corresponding to the choice. For example, the heuristic includes mathematical computations including numbers and variables. The choices resolve the variable to known numbers allowing the benefit to be obtained from the heuristics. After the benefits of both choices have been obtained, the choice with the highest benefit is positioned in order in the choice list. The remaining choice is placed or written next in the choice list. The goals list (130) or the global production strategy 200 for example, could be found in the memory of the planner such as RAM, ROM, etc. or could be found in a disk system.

Figure 7:
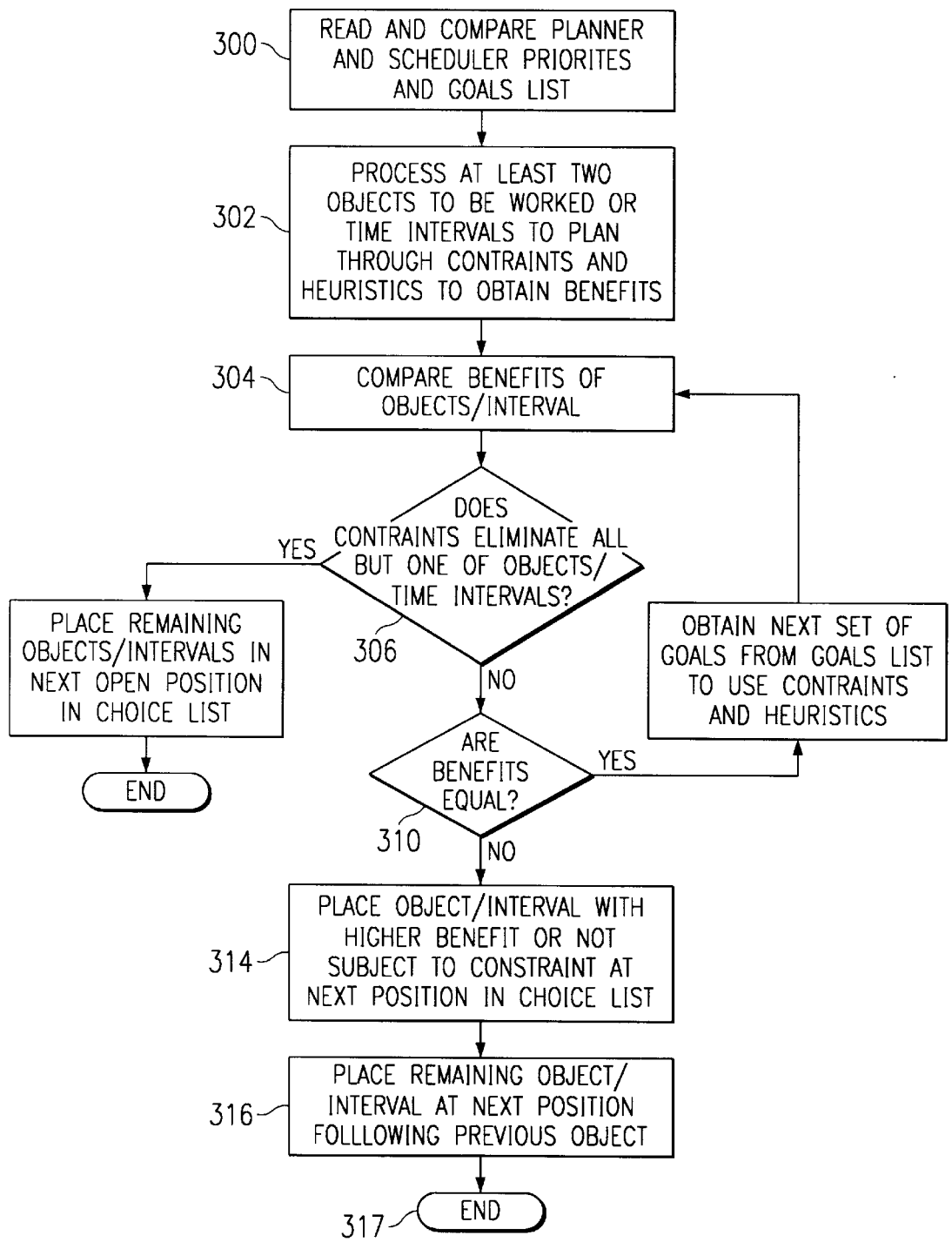
FIG. 7 is a flow chart of the present invention.

The operation described above is illustrated in FIG. 7. At step (300), the planner and scheduler priorities and goals list is read, for example by a computer, a minicomputer or microcomputer, and compared to produce the global production strategy. At step (302), at least two objects or intervals are evaluated by the constraints and heuristics to obtain the relative benefits of at least two objects. At step (304), the benefits obtained by the objects/intervals are compared. At step (306), a determination is made if the constraint associated with the goals eliminates only one of the objects or the time intervals. If the constraint does not eliminate all of the objects or intervals, the remaining objects/intervals are placed in next position in the choice list as in step (306). If the constraint does not eliminate all of the objects or intervals, a determination is made at step (310) to determine if the benefits are equal or does the constraint eliminate all the choices. If the current goal shows that the objects are of equal benefit, the next set of goals from the goals list are then used and control is transferred to Step 304. If not all the benefits are equal or all the choices are eliminated through constraints at step (314), the object/interval with the higher benefit or the object or the interval not subject to the constraint are placed in the next position of the choice list. At step (316), the remaining object/interval with the lower benefit or subject to the constraint is placed at the following position in the choice list. The operation stops at step (317).

Once the choice list has been completed, the object or time interval is employed to plan objects during successive time intervals to be released to queues of machines of machine groups of a facility.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. An apparatus for generating a plan, comprising:

circuitry for reading a list of priorities including both planner goals and scheduling goals and a goals list including goals indicating either a planner goal or a schedule goal comprising;

circuitry for producing a global production strategy list from said priorities list and said goals list; and circuitry for resolving a choice from said goals list.

2. An apparatus for generating a plan as in claim 1, wherein said goal includes an indication to indicate if said goal is either a planner goal or a schedule goal.

3. An apparatus for generating a plan, as in claim 1 wherein said global production strategy list includes a heuristic to resolve the choice.

4. An apparatus for generating a plan, as in claim 1, wherein said global production strategy includes constraints to resolve the choice.

5. An automated machine implemented method for generating a plan, comprising the steps of:

reading a list of priorities including both planner goals and scheduling goals and a goals list including goals indicating either a planner or a scheduler goal;

the step of producing a global production strategy list from said list of priority and goals list; and the step of resolving a choice from said goals list.

6. An automated machine implemented method for producing a plan as in claim 1, wherein the method includes the step of providing an indication to indicate if said goal is either a planner goal or a scheduler goal.

7. An automated machine implemented method of producing a plan as in claim 5, wherein the method includes the step of providing heuristics to resolve the choice.

8. An automated machine implemented method for producing a plan as in claim 5, wherein the method steps include providing constraints to resolve the choice.

9. An apparatus for generating a plan, comprising:

means for reading a list of priorities including both planner goals and scheduling goals and a goals list including goals indicating either a planner goal or a schedule goal comprising;

means for producing a global production strategy list from said priorities list and said goals list; and means for resolving a choice from said goals list.

10. An apparatus for generating a plan as in claim 9, wherein said goal includes an indication to indicate if said goal is either a planner goal or a schedule goal.

11. An apparatus for generating a plan, as in claim 9 wherein said global production strategy list includes a heuristic to resolve the choice.

12. An apparatus for generating a plan, as in claim 9, wherein said global production strategy includes constraints to resolve the choice.

* * * * *